United States Patent
Lee et al.

(10) Patent No.: US 10,313,968 B2
(45) Date of Patent: Jun. 4, 2019

(54) SYSTEM AND METHOD FOR OPERATING BASE STATION WITH LOW-LEVEL POWER

(71) Applicant: KT CORPORATION, Gyeonggi-do (KR)

(72) Inventors: Ki-Ho Lee, Gyeonggi-do (KR); Byungsuk Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/838,424

(22) Filed: Dec. 12, 2017

(65) Prior Publication Data

US 2018/0167875 A1    Jun. 14, 2018

(30) Foreign Application Priority Data

Dec. 13, 2016 (KR) ........................ 10-2016-0169744

(51) Int. Cl.
| | |
|---|---|
| *H04M 3/00* | (2006.01) |
| *H04W 52/02* | (2009.01) |
| *H04L 5/00* | (2006.01) |
| *H04W 16/28* | (2009.01) |
| *H04W 16/14* | (2009.01) |
| *H04W 16/26* | (2009.01) |

(52) U.S. Cl.
CPC ........... *H04W 52/0206* (2013.01); *H04L 5/00* (2013.01); *H04L 5/0032* (2013.01); *H04W 16/14* (2013.01); *H04W 16/26* (2013.01); *H04W 16/28* (2013.01); *Y02D 70/00* (2018.01); *Y02D 70/10* (2018.01); *Y02D 70/12* (2018.01); *Y02D 70/126* (2018.01); *Y02D 70/1262* (2018.01)

(58) Field of Classification Search
CPC ... H04W 84/045; H04W 16/32; H04W 24/08; H04W 12/06; H04W 36/22
USPC .......... 455/452.1, 418, 411, 426.1, 419, 436, 455/522, 437, 561, 434, 405
See application file for complete search history.

(56) References Cited

U.S. PATENT DOCUMENTS

| | | | | |
|---|---|---|---|---|
| 2013/0053065 | A1* | 2/2013 | Xiao | .......................... G01S 5/02 455/456.1 |
| 2013/0231115 | A1* | 9/2013 | Lin | ................... H04W 36/0083 455/436 |
| 2014/0287734 | A1* | 9/2014 | Lee | ................... H04W 52/0206 455/418 |
| 2014/0341182 | A1* | 11/2014 | Gage | ..................... H04W 12/04 370/331 |

(Continued)

FOREIGN PATENT DOCUMENTS

| | | |
|---|---|---|
| KR | 10-2012-0019867 A | 3/2012 |
| KR | 10-2014-0116980 A | 10/2014 |

(Continued)

*Primary Examiner* — Joseph Arevalo
(74) *Attorney, Agent, or Firm* — IP Legal Services, LLC

(57) ABSTRACT

Disclosed is a system for operating a base station with low-level power and a method thereof. The system includes: a master base station for servicing a macro cell; and a plurality of secondary base stations for servicing a small cell, and activating operation power according to a request by the master base station, wherein the master base station selectively activates operation power of at least one secondary base station for transmitting/receiving data to/from the terminal from among the plurality of secondary base stations in a minimum power state.

12 Claims, 9 Drawing Sheets

(56) References Cited

U.S. PATENT DOCUMENTS

| | | | |
|---|---|---|---|
| 2015/0163801 A1* | 6/2015 | Sadek | H04W 72/0446 370/336 |
| 2015/0237546 A1* | 8/2015 | Lin | H04W 36/0083 455/436 |
| 2015/0373559 A1* | 12/2015 | Hong | H04W 16/32 370/329 |
| 2016/0105853 A1* | 4/2016 | Zhao | H04W 52/244 370/311 |
| 2016/0192345 A1* | 6/2016 | Joung | H04W 16/08 455/452.1 |
| 2016/0192433 A1* | 6/2016 | Deenoo | H04W 72/046 370/329 |
| 2017/0171786 A1* | 6/2017 | Mochizuki | H04W 36/00835 |
| 2018/0092118 A1* | 3/2018 | Kim | H04W 72/12 |

FOREIGN PATENT DOCUMENTS

| | | |
|---|---|---|
| KR | 10-2015-0095505 A | 8/2015 |
| KR | 10-1625552 B1 | 5/2016 |
| KR | 10-1643130 B1 | 8/2016 |

* cited by examiner

SYSTEM AND METHOD FOR OPERATING BASE STATION WITH LOW-LEVEL POWER

CROSS-REFERENCE TO RELATED APPLICATION

This application claims priority to and the benefit of Korean Patent Application No. 10-2016-0169744 filed in the Korean Intellectual Property Office on Dec. 13, 2016, the entire contents of which are incorporated herein by reference.

BACKGROUND OF THE INVENTION

(a) Field of the Invention

The present invention relates to a system and method for operating a base station with low level power.

(b) Description of the Related Art

For a radio communication system to satisfy increasing demands of radio data traffic, efforts to develop a beyond 4G network system, a post-LTE improved fifth generation (5G) system, and a pre 5G communication system are in progress.

The 5G system is considered in a millimeter wave (mmWave) band, particularly the 60 GHz band, and in order to reduce a route loss of radio waves in this band and increase the transmit distance of the radio waves, techniques including beamforming, massive MIMO, full dimensional MIMO (FD-MIMO), an array antenna, analog beam-forming, and a large scale antenna are currently being discussed.

Here, a 5G base station using a mmWave band changes a base station coverage depending on changes of users and objects. There are two cases of changing.

One is changing the base station coverage in a busy hour. Herein, it is needed to build a plurality of base stations accessible per user. In the busy hour, there are many factors, such as people or objects, that hinder the mmWave radio waves, so cell coverage is reduced. Therefore, a design considering the blocking of mmWave signals by people and objects is required.

The other is changing the base station coverage in an idle hour. In the idle hour, the number of objects hindering the radio waves are reduced, so the coverage increases. Therefore, unnecessary base stations need a reduction of power consumption according to a dynamic power off situation.

Here, the busy hour represents an hour when the greatest number of calls are generated in a day, and call attempts generated in the busy hour are referred to as busy hour call attempts. The hour when the greatest number of calls are generated in a day is referred to as the busy hour, and the hour when the least number of calls are generated in a day is referred to as the idle hour.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for operating a base station with low-level power for dynamically controlling power of the base station.

An exemplary embodiment of the present invention provides a system for operating a base station with low-level power, including: a master base station for servicing a macro cell; and a plurality of secondary base stations for servicing a small cell, and activating operation power according to a request by the master base station, wherein the master base station selectively activates operation power of at least one secondary base station for transmitting/receiving data to/from the terminal from among the plurality of secondary base stations in a minimum power state.

When receiving a data download request from the terminal, the master base station may activate operation power of at least one secondary base station provided near the terminal from among the plurality of secondary base stations.

The secondary base station may provide a high-speed data service that is faster than the master base station, and the master base station may activate operation power of the at least one secondary base station when the download-requested data need a high-speed data service.

The master base station may activate operation power of at least one secondary base station provided near the terminal, may request adjacent base station signal sensing information from the terminal to receive the same, and may deactivate operation power of remaining secondary base stations except for one secondary base station included in the adjacent base station signal sensing information from among at least one secondary base station of which operation power is activated.

The master base station may deactivate operation power of the remaining secondary base stations except for one secondary base station with the greatest received signal intensity when there are a plurality of secondary base stations included in the adjacent base station signal sensing information.

When there is no base station included in the adjacent base station signal sensing information from among at least one secondary base station of which the operation power is activated, the master base station may extend an area provided near the terminal, may activate operation power of at least one secondary base station covering the extended area, may request adjacent base station signal sensing information from the terminal to receive the same, and may deactivate operation power of remaining secondary base stations except for one secondary base station included in received adjacent base station signal sensing information and having the greatest received signal intensity from among at least one secondary base station covering the extended area.

The master base station may cover a first communication network, and the plurality of secondary base stations may cover a second communication network that is different from the first communication network.

The first communication network may be a communication network for using a long term evolution (LTE) frequency bandwidth, and the second communication network may be a communication network for using a millimeter wave (mmWave) band.

The plurality of secondary base stations may be beamforming base stations for transmitting a plurality of directional beams.

Another embodiment of the present invention provides a method for operating a base station with low-level power by a master base station for servicing a macro cell, including: receiving a data download request from a terminal; and activating operation power of at least one secondary base station provided near the terminal from among at least one secondary base station for servicing a small cell, wherein the download requested data are transmitted to the terminal through the master base station and at least one secondary base station of which the operation power is activated.

The activating may include: activating operation power of at least one secondary base station included in a first area provided near a present position of the terminal from among a plurality of secondary base stations; requesting adjacent base station signal sensing information from the terminal and receiving the same; selecting at least one secondary base station included in the adjacent base station signal sensing information from among at least one secondary base station of which operation power is activated, and activating operation power; and deactivating operation power of the remaining secondary base stations except for the selected secondary base station.

The method may further include, between the requesting and receiving and the selecting and activating operation power, determining whether the adjacent base station signal sensing information includes at least one activated secondary base station, and when it does not include a secondary base station, activating operation power of at least one secondary base station included in a second area extended to be greater than the first area, requesting the adjacent base station signal sensing information to receive the same, and repeating the determining.

The deactivating may include deactivating operation power of remaining secondary base stations except for one secondary base station with the greatest received signal intensity when there are a plurality of secondary base stations included in the adjacent base station signal sensing information.

Yet another embodiment of the present invention provides a method for operating a base station with low-level power by a plurality of secondary base stations for servicing a small cell, including: activating operation power of the base station when receiving a power on instruction from a master base station for servicing a macro cell in a minimum power state; performing a dual connectivity process with the master base station and a terminal connected to the master base station according to a request by the master base station; and transmitting the data of which downloading is requested by the terminal to the terminal, wherein the power on instruction is transmitted when the terminal requests the master base station to download data.

The method may further include, after the activating, deactivating the operation power according to a request by the master base station when a signal of the secondary base station is not included in adjacent base station signal sensing information sensed by the terminal.

The master base station may use a legacy frequency bandwidth, and the at least one secondary base station may use a new frequency bandwidth of which a data transmission speed is greater than that of the legacy frequency bandwidth.

According to the exemplary embodiment of the present invention, the base station is operable with minimum power in the idle hour, and the base station operation power is activated if needed, thereby reducing unneeded power consumption of the 5G base station. The induction of interference of the adjacent cell by the 5G base station may be prevented.

DETAILED DESCRIPTION OF THE EMBODIMENTS

Figure 1:
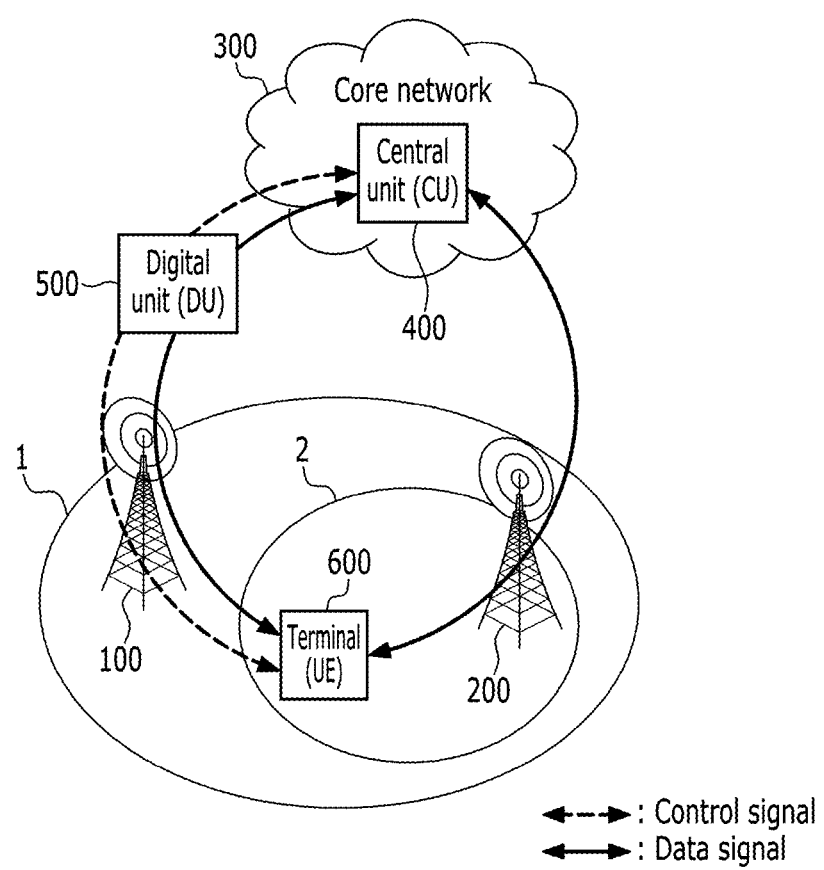
FIG. 1 shows a system for operating a base station with low-level power according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification Unless explicitly described to the contrary, the word "comprise" and variations such as "comprises" or "comprising" will be understood to imply the inclusion of stated elements but not the exclusion of any other elements.

The terms "-er", "-or", and "module" described in the specification mean units for processing at least one function and operation, and can be implemented by hardware components or software components and combinations thereof.

A terminal may designate a mobile terminal (MT), a mobile station (MS), an advanced mobile station (AMS), a high reliability mobile station (HR-MS), a subscriber station (SS), a portable subscriber station (PSS), an access terminal (AT), or user equipment (UE), and it may include the entire or part of functions of the MT, the MS, the AMS, the HR-MS, the SS, the PSS, the AT, and the UE.

Further, the base station (BS) may designate an advanced base station (ABS), a high reliability base station (HR-BS), a small base station, a nodeB (node B), an evolved node B (eNodeB), an access point (AP), a radio access station (RAS), a base transceiver station (BTS), a mobile multihop relay (MMR)-BS, a relay station (RS) functioning as a base station, or a high reliability relay station (HR-RS) functioning as a base station, and it may include the entire or part of functions of the ABS, the HR-BS, the small base station, the nodeB, the eNodeB, the AP, the RAS, the BTS, the MMR-BS, the RS, and the HR-RS.

A system and method for operating a base station with low-level power according to an exemplary embodiment of the present invention will now be described with reference to accompanying drawings.

Figure 2:
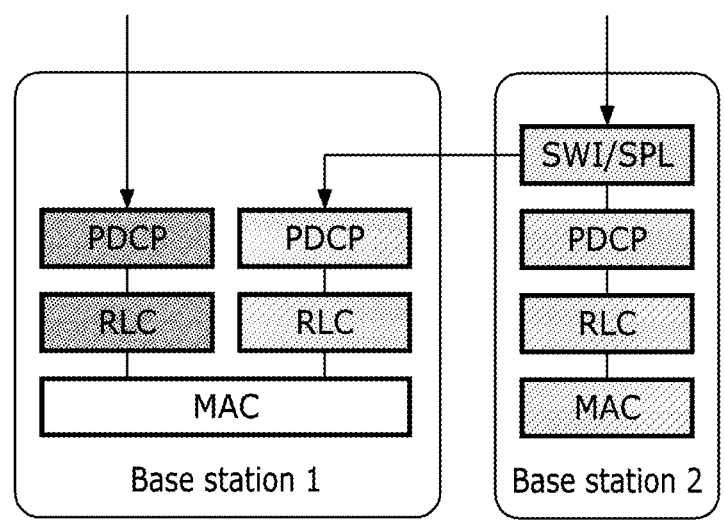
FIG. 2 shows a user plane of a radio interface protocol between base stations according to an exemplary embodiment of the present invention.
Figure 3:
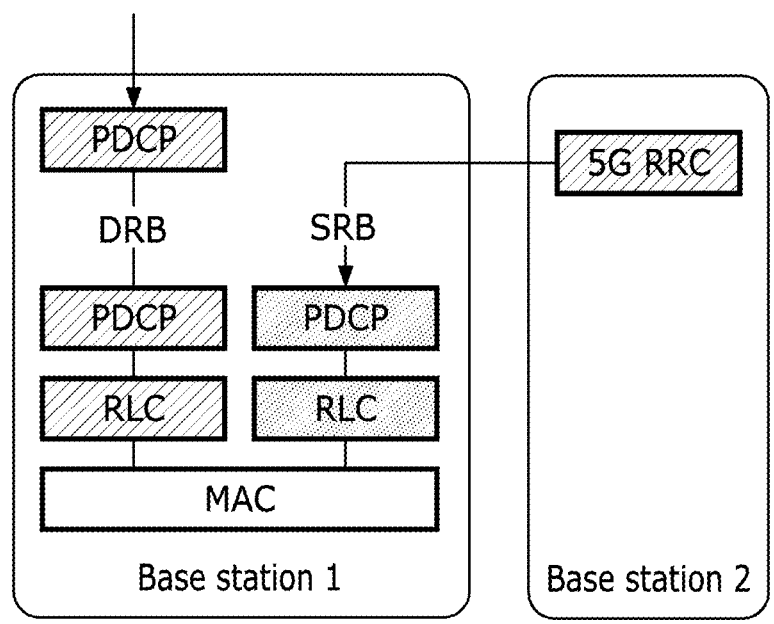
FIG. 3 shows a control plane of a radio interface protocol between base stations according to an exemplary embodiment of the present invention.
Figure 4:
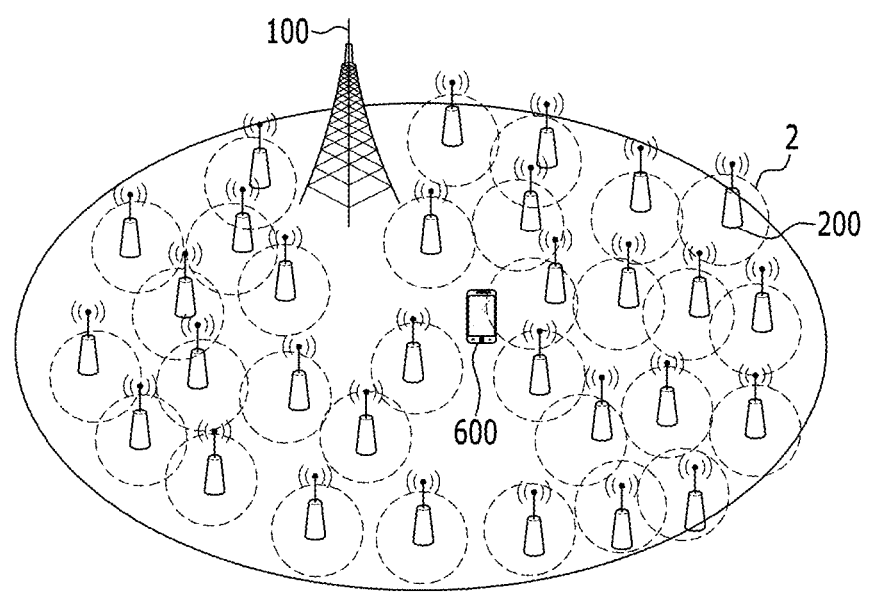
FIG. 4 shows a coverage relationship between a master base station and a secondary base station according to an exemplary embodiment of the present invention.

FIG. 1 shows a system for operating a base station with low-level power according to an exemplary embodiment of the present invention, FIG. 2 shows a user plane of a radio interface protocol between base stations according to an exemplary embodiment of the present invention, FIG. 3 shows a control plane of a radio interface protocol between base stations according to an exemplary embodiment of the present invention, and FIG. 4 shows a coverage relationship between a master base station and a secondary base station according to an exemplary embodiment of the present invention.

Referring to FIG. 1, the system for operating a base station with low-level power includes a master base station 100 for servicing a macro cell 1, and a secondary base station 200 for servicing a small cell 2.

In this instance, the master base station 100 is connected through a digital unit (DU) 500 to a central unit (CU) 400 provided on a core network 300.

Here, the digital unit (DU) 500 and the central unit (CU) 400 represent a configuration followed by a separation of the base station, and they are mainly disposed at a specific area such as a telephone station. They may include a higher layer of a PHY layer from among layer functions of the base station. In this case, the base stations 100 and 200 are realized with an access unit (AU), an antenna unit (AU), and a radio unit (RU) disposed in a service area.

A terminal (UE) 600 may concurrently access the master base station 100 and the secondary base station 200 to receive a data service, and the concurrent access is allowable through dual connectivity.

The dual connectivity represents an operation for using a radio resource provided by a plurality of different network points (a master base station and a secondary base) to which a radio resource control (RRC)-connected terminal is connected through a non-idealistic back hole.

Regarding the dual connectivity, the master base station 100 forms a radio resource control (RRC) connection with the terminal (UE) 600, and it performs a mobility anchor function to the core network 300. The secondary base station 200 represents a base station distinguished from the master base station 100 to provide an additional radio resource to the terminal 600 in the dual connectivity, and it corresponds to a secondary base station (SeNB, secondary eNB).

The master base station 100 transmits a control signal and a data signal, and the secondary base station 200 transmits a data signal. That is, the terminal (UE) 600 receives data through an interlink between the master base station 100 and the secondary base station 200.

A radio interface protocol for the interlink between the master base station 100 and the secondary base station 200 is provided in a like manner of FIG. 2 and FIG. 3.

The master base station 100 includes a medium access control (MAC) layer, a radio link control (RLC) layer, a packet data convergence protocol (PDCP) layer, and a radio resource control (RRC) layer, and the secondary base station 200 includes a MAC layer, a RLC layer, a PDCP layer, an SWI (switching)/SPL (splitting) layer, and a 5G RRC layer.

In this instance, FIG. 2 shows a user plane which indicates a path for transmitting a data signal (e.g., voice data or Internet packet data) generated by an application layer. Referring to FIG. 2, the data signal is transmitted to the terminal 600 by interlink of a PDCP layer of the master base station 100 and an SWI/SPL layer of the secondary base station 200.

FIG. 3 shows a control plane, and it indicates a path for transmitting a control message used for managing a call between the terminal 500 and an E-UTRAN. Referring to FIG. 3, the master base station 100 transmits a control signal through a signaling radio bearer (SRB). To link the secondary base station 200 and the data signal, a data radio bearer (DRB) is connected between the 5G RRC layer of the secondary base station 200 and the PDCP layer of the master base station 100. The DRB is a data transmitting bearer.

Referring to FIG. 4, a macro cell 1 serviced by one master base station 100 includes small cells 2 serviced by a plurality of secondary base stations 200.

A first communication network covered by the master base station 100 is different from a second communication network covered by the secondary base station 200. In this instance, the first communication network is a communication network using a long term evolution (LTE) frequency bandwidth, and the second communication network is a communication network using a mmWave band.

Here, coverage of the secondary base station 200 increases in the idle hour when the number of objects hindering the radio wave is reduced. Therefore, it is needed for the base station to dynamically control power in the idle hour.

In the idle hour, the master base station 100 dynamically controls power of a plurality of secondary base stations 200 included in the macro cell 1, a method of which will now be described.

Figure 5:
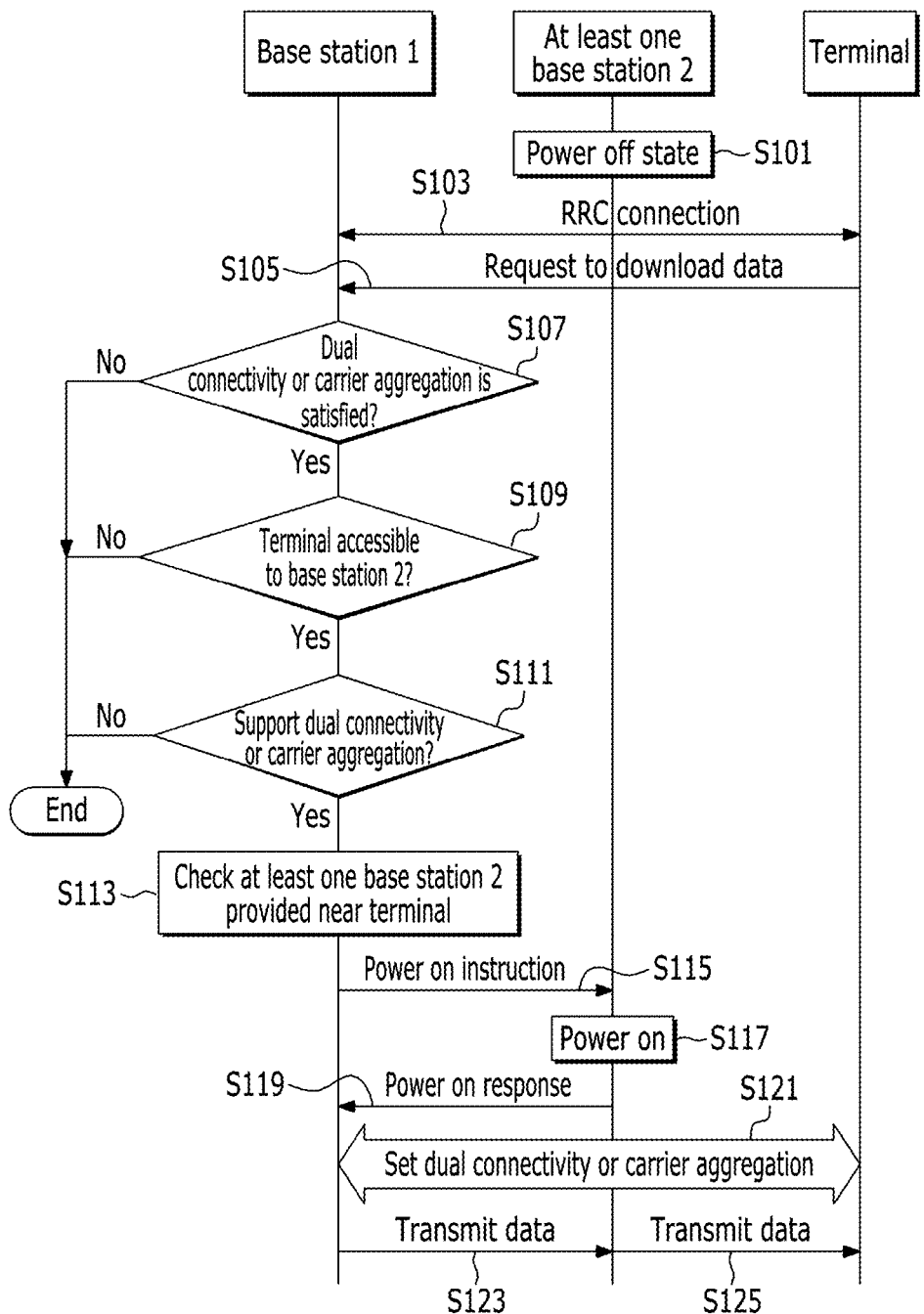
FIG. 5 shows a flowchart of a method for operating a base station with low-level power according to an exemplary embodiment of the present invention.

FIG. 5 shows a flowchart of a method for operating a base station with low-level power according to an exemplary embodiment of the present invention.

Referring to FIG. 5, at least one secondary base station 200 provided in the macro cell 1 of the master base station 100 is in a minimum power state (S101). Here, the minimum power represents a state in which a base station is operable with minimum power that may receive a power on instruction from the master base station 100, such that it is not a complete power off state, but is a state in which the base station may not be operated in a normal manner. For example, the secondary base station 200 that is operated with minimum power does not transmit a signal to the terminal 600, so the terminal 600 may not sense the signal provided by the secondary base station 200.

The master base station 100 is RRC-connected to the terminal 600 (S103), and it receives a data download request from the terminal 600 (S105).

The master base station 100 determines whether download-requested data satisfy the dual connectivity condition or the carrier aggregation condition (S107). That is, the dual connectivity or the carrier aggregation is not performed for all data download requests, but the dual connectivity or the carrier aggregation may be performed in a specific condition. For example, it may determine whether the download request needs high-rate data transmission.

When the dual connectivity condition or the carrier aggregation is satisfied, the master base station 100 determines whether the download-requested terminal 600 is a terminal accessible to the secondary base station 200 (S109). Here, it may determine whether the terminal may be available for millimeter wave frequency communication used by the secondary base station 200.

When the master base station 100 determines the terminal 600 to be accessible to the secondary base station, the master base station 100 determines whether it may perform dual connectivity access or carrier aggregation access with the secondary base station 200 (S111). That is, it determines whether an interlink interface between base stations is possible.

When the master base station 100 determines that it may perform dual connectivity access or carrier aggregation access with the secondary base station 200, the master base station 100 checks a position of the current terminal 600 to check at least one secondary base station 200 provided near the terminal 600 (S113).

The master base station 100 transmits a power on instruction to the at least one secondary base station 200 checked in S113 (S115).

When receiving the power on instruction, the at least one secondary base station 200 is turned on (S117), and it transmits a power on response to the master base station 100 (S119).

The master base station 100 sets dual connectivity or carrier aggregation with one of the turned-on secondary base stations 200 and the terminal 600 (S121).

The master base station 100 transmits the data signal requested by the terminal 600 to the terminal 600 through the secondary base station 200 (S123) and (S125).

Figure 6:
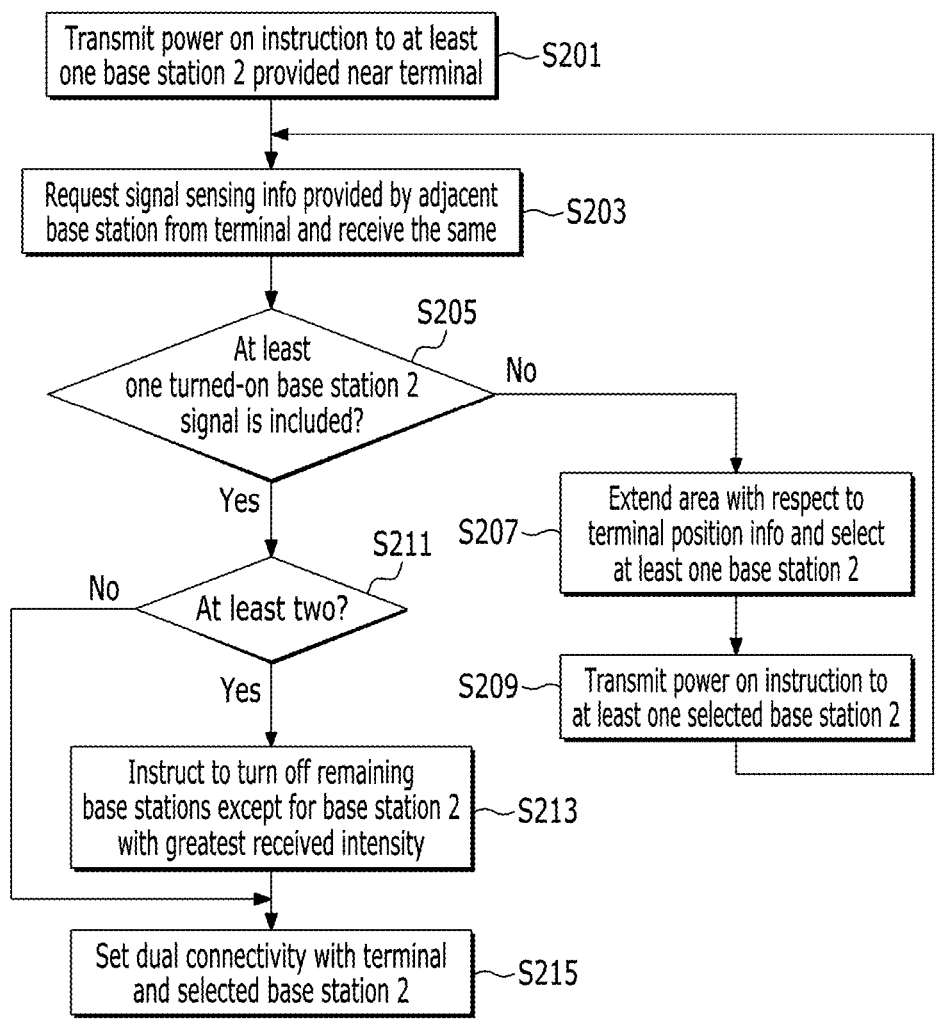
FIG. 6 shows a flowchart of a method for operating a base station with low-level power according to another exemplary embodiment of the present invention.
Figure 7:
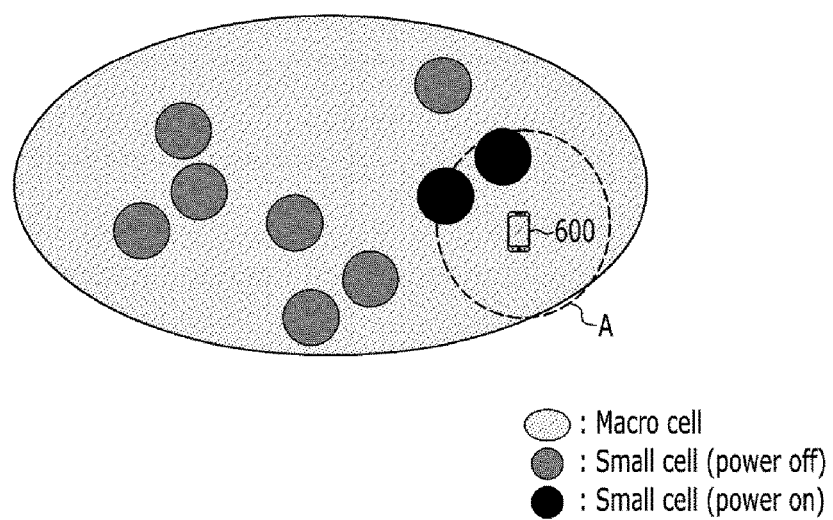
FIG. 7 shows a configuration for dynamically controlling power of a base station according to an exemplary embodiment of the present invention.
Figure 8:
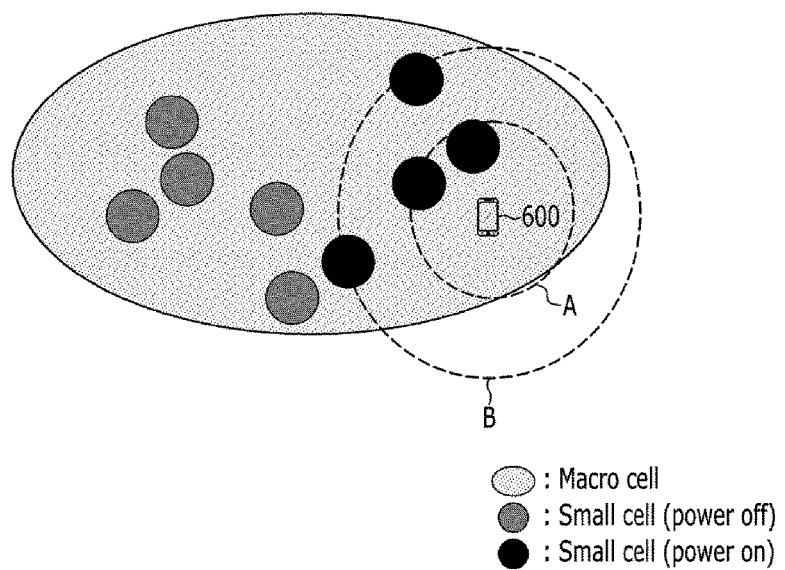
FIG. 8 shows a configuration for extending an activated range of a base station according to an exemplary embodiment of the present invention.

FIG. 6 shows a flowchart of a method for operating a base station with low-level power according to another exemplary embodiment of the present invention, FIG. 7 shows a configuration for dynamically controlling power of a base station according to an exemplary embodiment of the present invention, and FIG. 8 shows a configuration for extending coverage for turning on power of a base station according to an exemplary embodiment of the present invention.

Here, FIG. 6 shows an operation of the master base station 100, showing an operation after the stage of S113 of FIG. 5.

Referring to FIG. 6, the master base station 100 transmits a power on instruction to at least one secondary base station provided near the terminal 600 (S201).

Here, referring to FIG. 7, the master base station 100 activates operation power by checking at least one secondary base station 200 provided in an area (A) with a predefined radius with respect to a present position of the terminal 600, or a small cell covered by the secondary base station 200.

The master base station 100 requests the terminal 600 to sense the intensity of the signal received from an adjacent base station to receive adjacent base station signal sensing information (S203).

The master base station 100 determines whether the secondary base stations having activated operation power in S201 is included in the adjacent base station signal sensing information received in S203 (S205).

When not included, the master base station 100 extends the area provided near the position of the terminal 600, selects at least one secondary base station 200 covering the extended area (S207), and transmits a power on instruction thereto (S209).

Referring to FIG. 8, the area for activating operation power is extended to the area B from the area A. That is, the master base station 100 transmits a power on instruction to the secondary base stations 200 provided in the area B. The stage starts again from S203, and the stages S203 to S209 are repeated until at least one turned-on base station is included in the adjacent base station signal sensing information measured by the terminal 600.

On the contrary, when included in S205, it is determined whether there are at least two secondary base stations 200 (S211).

When it is determined that there are at least two secondary base stations 200, the power off instruction is transmitted to the remaining secondary base stations except for the one secondary base station of which a receiving intensity is measured to be the greatest from among the corresponding secondary base stations 200 based on adjacent base station signal sensing information (S213). The remaining secondary base stations return to a minimum power state.

The master base station 100 sets dual connectivity with the one secondary base station 200 determined in S211 or the one secondary base station 200 selected in S213 and the terminal 600 (S215).

Figure 9:
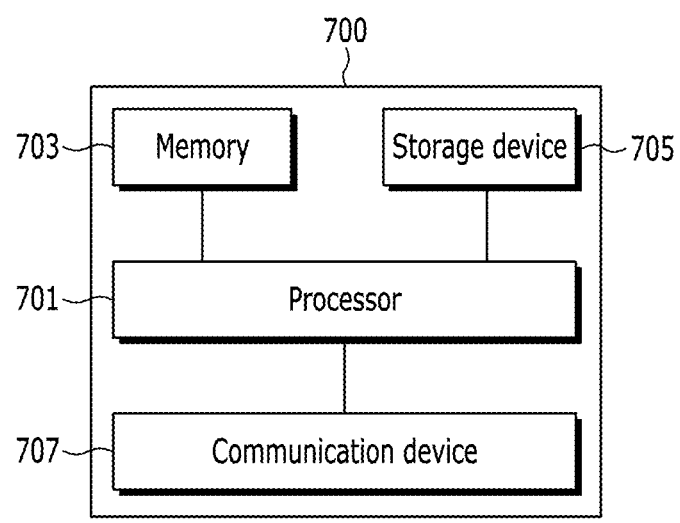
FIG. 9 shows a hardwired block diagram of a base station according to an exemplary embodiment of the present invention.

FIG. 9 shows a hardwired block diagram of a base station according to an exemplary embodiment of the present invention, showing a hardwired configuration of a master base station 100 or a secondary base station 200.

Referring to FIG. 9, a hardwired configuration 700 of the master base station 100 or a hardwired configuration 700 of the secondary base station 200 includes a processor 701, a memory device 703, a storage device 705, and at least one communication device 707, and it stores a program combined with hardware at a designated location and performed.

The hardwired configuration 700 has a configuration and capabilities for performing the present invention. The program includes instructions having realized the operation method of the present invention described with reference to FIG. 1 to FIG. 8, and it realizes the present invention in combination with hardware such as the processor 701 or the memory device 703.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for operating base stations with low power consumption, comprising:
   a master base station for servicing a macro cell; and
   a plurality of secondary base stations each for servicing a corresponding small cell in the macro cell, being inactivated to be in a minimum power state only for receiving a signal, and being activated to be in a normal state for transmitting and receiving signals according to a request by the master base station,
   wherein the master base station selectively activates at least one secondary base station in the minimum power state to be in the normal state for transmitting/receiving data to/from the terminal from among the plurality of secondary base stations, and
   wherein when receiving a data download request from the terminal, the master base station selects at least one secondary base station located within a predetermined distance from the terminal and activates the selected at least one secondary base station to be in the normal state,
   wherein the master base station activates the selected at least one secondary base station located within a predetermined distance from the terminal, requests adjacent base station signal sensing information from the terminal, and deactivates unselected secondary base stations included in the adjacent base station signal sensing information except for the selected at least one secondary base station, and wherein when the adjacent base station signal sensing information includes more than two secondary base stations, the master base station determines one secondary base station having a highest reception signal intensity and deactivates the other secondary base stations except for the determined one secondary base station.

2. The system of claim 1, wherein
the selected at least one secondary base station is capable of providing a high-speed data service that is faster than the master base station, and
the master base station activates the selected at least one secondary base station in the minimum power state to be in the normal state when the download-requested data need a high-speed data service.

3. The system of claim 1, wherein
when the adjacent base station signal sensing information excludes the selected at least one secondary base station, the master base station extends a search area associated with the terminal, activates at least one secondary base station in the extended area, requests adjacent base station signal sensing information related to the extended search area from the terminal, and deactivates secondary base stations included in the adjacent base station signal sensing information except for the activated secondary base station.

4. The system of claim 1, wherein
the master base station provides a service to a first communication network, and
the plurality of secondary base stations provides a service to a second communication network that is different from the first communication network.

5. The system of claim 4, wherein
the first communication network is a communication network for using a long term evolution (LTE) frequency bandwidth, and
the second communication network is a communication network for using a millimeter wave (mmWave) band.

6. The system of claim 5, wherein
the plurality of secondary base stations are beamforming base stations for transmitting a plurality of directional beams.

7. A method for operating base stations with low power consumption by a master base station for servicing a macro cell, comprising:
receiving a data download request from a terminal; and
determining at least one secondary base station located within a predetermined distance from the terminal among a plurality of secondary base stations in a minimum power state only for receiving a signal and activating the determined at least one secondary base station to be in a normal state for transmitting and receiving signals to/from the terminal,
wherein the requested data is download to the terminal through the master base station and the activated at least one secondary base station, and
wherein the activating includes: activating at least one secondary base station included in a first area of the terminal from among a plurality of secondary base stations; requesting adjacent base station signal sensing information from the terminal; selecting at least one secondary base station included in the adjacent base station signal sensing information and among the activated at least one secondary base station and activating the selected at least one secondary base station to be in the normal state; and deactivating unselected secondary base stations included in the adjacent base station signal sensing information to be in the minimum power state, except for the selected secondary base station.

8. The method of claim 7, further comprising:
between the requesting and receiving and the selecting and activating operation power,
determining whether the adjacent base station signal sensing information includes at least one activated secondary base station, and
when the adjacent base station signal sensing information excludes a secondary base station, activating at least one secondary base station included in a second area extended to be greater than the first area, requesting and receiving the adjacent base station signal sensing information associated with the second area, and repeating the determining.

9. The method of claim 8, wherein
the deactivating includes
when the adjacent base station signal sensing information associated with the second area includes a plurality of secondary base stations, deactivating secondary base stations except for one secondary base station having the highest reception signal intensity.

10. A method for operating a plurality of base stations with low power consumption by a secondary base station for servicing a corresponding small cell, the method comprising:
maintaining a minimum power state for only receiving a signal, receiving a power-on instruction from a master base station, and activating a normal state for transmitting and receiving signals;
performing a dual connectivity process with the master base station and a terminal connected to the master base station according to a request by the master base station; and
receiving a data download request from the terminal and transmitting requested data to the terminal,
wherein the power-on instruction is transmitted when the terminal requests the master base station to download data,
wherein the master base station activates the plurality of base stations located within a predetermined distance from the terminal, requests base station signal sensing information from the terminal, selects at least one of the base stations as the secondary base station, and deactivates unselected base stations included in the adjacent base station signal sensing information except for the secondary base station, and
wherein the master base station determines a base station having a highest reception signal intensity as the secondary base station and deactivates the other base stations except for the determined one base station.

11. The method of claim 10, further comprising, after the activating,
deactivating the normal state to the minimum power state according to a request by the master base station when the secondary base station is not included in adjacent base station signal sensing information.

12. The method of claim 10, wherein
the master base station uses a legacy frequency bandwidth, and the at least one secondary base station uses a new frequency bandwidth of which a data transmission speed is faster than that of the legacy frequency bandwidth.

\* \* \* \* \*